May 8, 1962  D. L. BIESECKER  3,033,624
RETAINER BUSHING
Filed Nov. 23, 1959
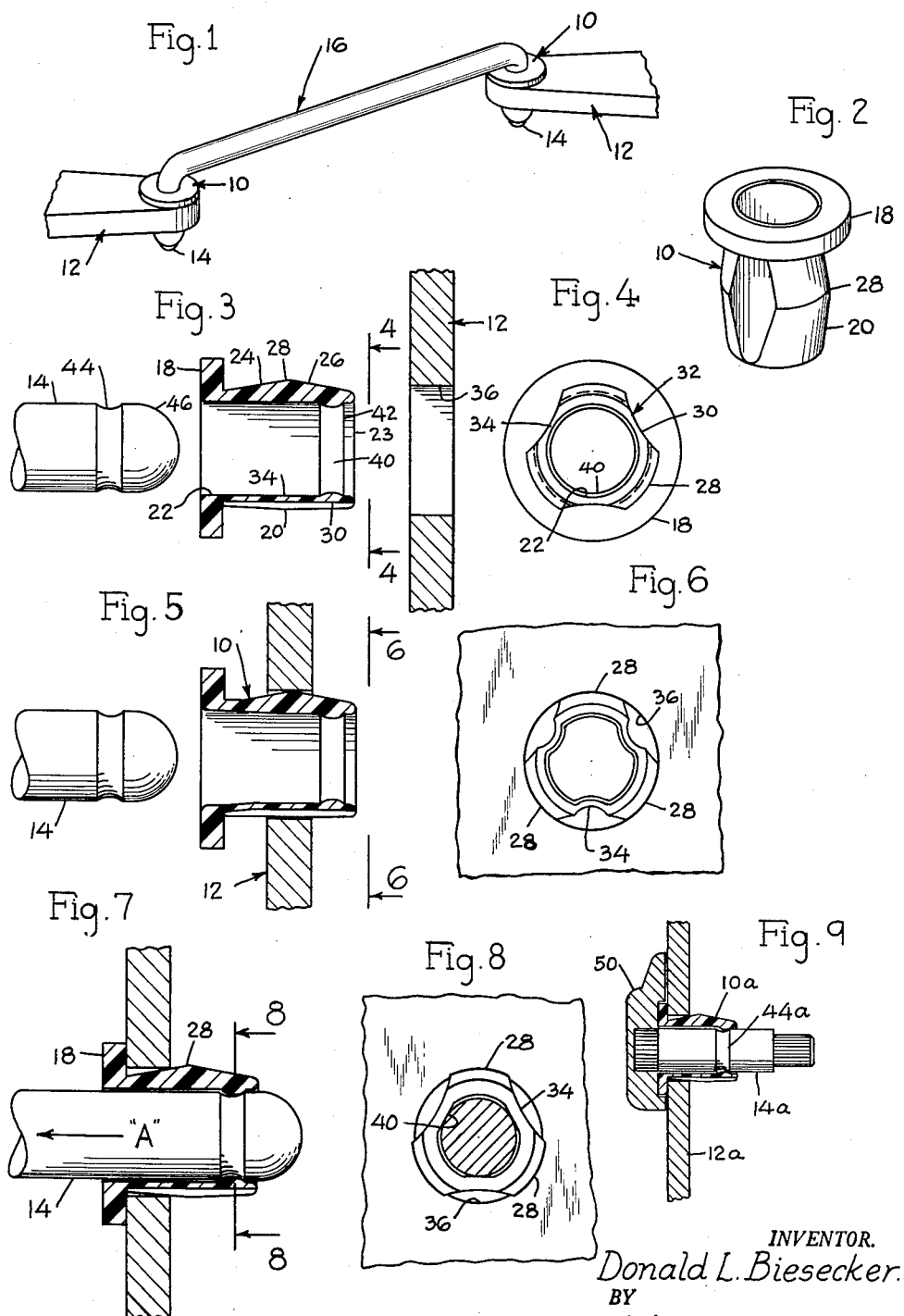
INVENTOR.
Donald L. Biesecker.
BY
Olson & Trexler
attys.

United States Patent Office 3,033,624
Patented May 8, 1962

3,033,624
RETAINER BUSHING
Donald L. Biesecker, Arlington Heights, Ill., assignor to Illinois Tool Works, Chicago, Ill., a corporation of Illinois
Filed Nov. 23, 1959, Ser. No. 854,882
2 Claims. (Cl. 308—238)

This invention relates to an improved bushing or stud retainer. More particularly, the invention relates to a one piece device adapted to rotatably retain a complementary stud member in a workpiece.

In many areas of the appliance and automotive manufacturing fields, it has been found desirable, because of the necessity of replacing worn out elements, to interconnect various members in the entire assembly by simple linkages for the transmission of mechanical motion. Linkages of this nature can be found in many places in automobiles, for example, between the accelerator pedal and the carburetor, in window raising devices, etc. The above examples are by no means the only ones where a stud is desired to be retained in a rotatable position relative to a workpiece. In instances where rods are inserted into workpieces and retained by suitable means, the problem of lubrication of such joints is ever present. In previous cases, where secondary elements have been interposed between the two rotating bodies, the resultant assembly has either been extremely costly or the retention powers of the secondary element have been inadequate for the application and subsequent separation of elements has occurred.

It is an object of this invention therefore, to provide an improved grommet or bushing for the retention of a stud member rotatably relative to a workpiece.

Another object of this invention is to provide a bushing which is capable of retaining a stud rotatably which is provided with a groove intermediate its ends.

Still another object of this invention is to provide a linkage bushing of one piece construction which can be easily inserted in a workpiece and will readily accept the stud to be retained therein and further which resists removal.

Other objects of this invention will become apparent when the specification is read in conjunction with the drawing wherein:

FIG. 1 is a perspective view of a typical installation of an embodiment of this invention;

FIG. 2 is a perspective view of an embodiment of this invention;

FIG. 3 is an exploded view in partial section of an embodiment of this invention along with a stud and a workpiece;

FIG. 4 is an end view of an embodiment of this invention taken along lines 4—4 of FIG. 3;

FIG. 5 is an exploded view in partial section of an embodiment of this invention shown in a partially installed position in a workpiece;

FIG. 6 is an end view of the embodiment of this invention taken along lines 6—6 of FIG. 5;

FIG. 7 is an elevation in partial section of the embodiment of this invention as applied to a work panel with the stud inserted therein;

FIG. 8 is a section taken along lines 8—8 of FIG. 7; and

FIG. 9 is a secondary application for the embodiment of the invention.

Referring now to the drawings, and particularly FIGS. 1 through 4, a typical installation for a linkage bushing of this type involves a plurality of retainer bushings 10, positioned in an apertured workpiece 12 and adapted to accept the stud 14, which in this installation are the laterally extending ends of the linkage rod 16.

The bushing 10 is provided with a radially extending head portion 18 and a shank 20 extending downwardly from head 18. Bushing 10 is a one piece plastic element which can be injection molded and is semi-rigid but has a limited amount of resilience or stretchability. It is also desirable that the plastic material have characteristic of lubricity. A substantially cylindrical bore 22 traverses the entire axial extent of the bushing and provides openings through the head 18 and through the end of the shank 20 remote from said head 18, said remote end being the entering or free end 23 of said shank.

The shank 20 can be described as having an upper and lower portion designated 24 and 26 respectively. Upper portion 24 extends downwardly from the under side of head 18 and diverges outwardly to a maximum diameter to form a shoulder means 28 axially spaced from the under side of head 18. The lower portion of the shank converges inwardly from the maximum diameter at shoulder means 28 towards the axis of the fastener. Thus, the wall thickness of the shank portions varies throughout the axial extent of said shank.

A plurality of grooves 30 are provided in the shank portion 20, being evenly spaced about the peripheral extent of the bushing 10 and preferably extend from the head to the free end of the shank. In the present instance the grooves are three in number, but the number is material only as to the application and forces desired. Grooves 30 are concave outwardly in cross section and, at their point of greatest radial penetration, as indicated by numeral 32, form a thin wall section or web 34, as best seen in FIGS. 3 and 4, which is substantially uniform throughout the axial extent of shank 20. Webs 34 facilitate the radial collapsing of the shoulder means as will be more fully described hereinafter. An annular protuberance or rib 40 projects inwardly from the internal wall of the bushing forming bore 22. Rib 40 is shown as being semi-toroidal in cross section. It is located in the vicinity of the end of the lower portion 26 of the shank, being intermediate the shoulder means 28 and the free end 23. It is preferably more remote from shoulder means 28 than from the entering end 23. It has been found that a substantial portion of the cylindrical bore 22 must lie between the free end 23 and the rib 40.

The diameter of stud 14 must be equal to or preferably slightly less than the diameter of bore 22. The complementary rotatable stud 14 is substantially cylindrical in cross section and is provided adjacent its free end with a groove 44, the groove 44 being substantially semi-toroidal in cross section, as shown, but most important being complementary in section to the rib 40. The end 46 of the stud 14, as shown, is curved to facilitate its introduction into the bushing, the curve being of a radius of curvature substantially greater than the radius of curvature of the semi-toroidal groove 44.

Referring now to FIGS. 5 and 6, the installation of this assembly is carried out by first introducing the bushing 10 into an aperture 36 of the workpiece 12, the aperture 36 being lesser in diameter than shoulder means 28. The tapered surface provided on lower portion 26 of the shank acts as a cam to depress the shoulder means 28 to fit within the aperture 36. This results, as seen in FIG. 6, in a radial depression or collapse of the shoulder means 28 which is permitted because of the radially inward flexing or bending of the webs 34. This action facilitates the radial compression necessary to permit mounting of the fastener. As the shoulder means pass through the aperture, they spring outwardly to substantially their normal initial position as generally seen in FIG. 7 with the under side of head 18 bearing on one side of the aperture and the shoulder means and adjacent portions of the upper portion of the shank underlying and engaging the under side of the panel. Once the bushing is finally seated in the apertured workpiece, it is thereafter possible to introduce the stud 14. As previously stated, stud 14 should preferably be equal in diameter to or slightly less than the diameter of the bore 22 so as to be readily accommodated therein until such time as the rounded nose portion 46 comes into contact with the rib 42. At this point the webs 34 are circumferentially stretched to accommodate the increased diameter until such time as the axial penetration of the stud within the bushing permits the rib 42 to be seated in the complementary groove 44. Thereafter, the bushing returns to its initial condition and the installation is completed. A bushing in this condition is generally shown in FIG. 7.

Any attempt to withdraw stud 14, as for example, in the direction of arrow A in FIG. 7, results in a more aggressive control of the stud within the workpiece. The groove 44 acting against the rib 40 forces the shoulder means 28 outwardly into a more aggressive contact with the under side of the panel. Such a radial expansion of shoulder means 28 results in stretching web 34 into substantially a straight line relationship. In the present example, which has three grooves 30, a triangulation effect is obtained and the portions of rib 40 carried by web 34 are forced into the same straight lined relationship and therefore are aggressively forced into the groove 44. Thus, it has been found that this device cannot be unintentionally removed from its applied position since removal requires a tremendous amount of force and in most instances results in a destruction of the fastener.

A further application of the principles taught by this invention is shown in FIG. 9 wherein similar parts bear similar numerals with the suffix "a." The application illustrated in FIG. 9 shows a rotatable shank 14a having a groove 44a intermediate its length retained in panel 12a in a rotatable fashion by bushing 10a with shank 14a being part of a control rod assembly which includes a nob 50. The assembly is utilized to provide panel retained rotatable member for controlling a secondary element behind the panel wall. Such an element can be a switch, rheostat, or any other device requiring a rotary control motion.

The embodiment of the invention disclosed herein shows a simple inexpensive device for the positive axial retention of a stud means which must be rotatably mounted in a panel. The choice of materials eliminates the necessity for lubrication between the joint members and further "noise proofs" the assembly. It is ideally adapted for mass production use since its application requires a minimum labor installation cost and is relatively maintenance free.

While other means of accomplishing the same may be apparent to those skilled in the arts, it is the intent of the inventor to be limited only by the appended claims and to cover other mechanical equivalents of the embodiment illustrated herein.

I claim:
1. A one piece tubular plastic bushing for use in accepting and rotatably mounting a complementary annularly grooved stud member in axially restrained position relative to a complementary apertured workpiece, said bushing including a head, a shank portion depending from said head and having shoulder means on the exterior thereof spaced from the underside of said head a predetermined distance and capable of retaining said bushing in the aperture of the complementary workpiece, a continuous bore of uniform cross sectional dimension traversing the entire length of said bushing, a continuous annular rib on the wall of said bore projecting radially inwardly and shaped complementary to the annular groove in the complementary stud member and adapted to engage the groove of the stud member when it is mounted in said bushing, said rib being located intermediate said shoulder means and the free end of said shank opposite the head, three axially arranged grooves provided in the outer surface of the shank portion and each groove extending from the head to the free end of said shank to provide radially thinned sections on the shank, said grooves being equally spaced from each other about the periphery of said shank portion and having a peripheral extent at least in the vicinity of the shoulders on the intermediate shank portions equal to that of the peripheral extent of said shoulder means in the same vicinity, said grooves providing thinned shank sections which when viewed in transverse section present a plurality of longitudinally extending curved concave faces opposite a substantially arcuate inner surface wall provided by the bore, the rib segments carried by said thinned sections and the thinned sections themselves adapted to collapse radially inwardly during insertion of the bushing into the apertured workpiece; the unrelieved shank portions on which said shoulder means are located providing a diametral measurement when the stud of the bushing is in normal position greater than the diameter of the complementary aperture with which it is to be associated so that after mounting of the bushing in the aperture of the workpiece the shoulders aggressively underlie the under surface of the workpiece, the shank portions of the bushing having the shoulder means thereon adapted to be flexed radially outwardly when an axial force is applied to a complementary grooved stud member mounted therein to cause said shoulders to more aggressively resist removal of the bushing, the rib segments carried by said thinned sections being distorted by the shank portions with the shoulder means thereon, said thinned sections and the associated ribs being distorted into a chordal form to aggressively resist removal of the complementary grooved stud from said bushing.

2. A bushing of the type described in claim 1, wherein the wall of the bore defines a circle, and the outer configuration of the peripherally spaced shank portions having shoulder means thereon define circles of varying diameter in cross section from the entering end portion of the stud through the shoulder means and to the vicinity of the head means provided at one end of said shank portion.

References Cited in the file of this patent

UNITED STATES PATENTS

| 128,959   | Harroun   | July 16, 1872  |
|-----------|-----------|----------------|
| 1,206,849 | Howe      | Dec. 5, 1916   |
| 2,420,826 | Irrgang   | May 20, 1947   |
| 2,647,774 | Newberry  | Aug. 4, 1953   |
| 2,884,283 | Korol et al. | Apr. 28, 1959 |
| 2,913,284 | Zankl     | Nov. 17, 1959  |
| 2,921,819 | Rifkin    | Jan. 19, 1960  |
| 2,936,015 | Rapata    | May 10, 1960   |
| 2,956,468 | Macy      | Oct. 18, 1960  |
| 2,956,605 | Rapata    | Oct. 18, 1960  |
| 2,984,698 | Strauss   | May 16, 1961   |

FOREIGN PATENTS

| 118,089 | Sweden | Feb. 4, 1947 |